United States Patent Office 2,946,739
Patented July 26, 1960

2,946,739

HYDROCRACKING CATALYST AND PROCESS

Lloyd E. Gardner and Robert J. Hogan, Bartlesville, Okla., assignors to Phillips Petroleum Company, a corporation of Delaware No Drawing. Filed Nov. 13, 1958, Ser. No. 773,561

5 Claims. (Cl. 208—112)

This invention relates to a hydrocracking catalyst. It also relates to a hydrocracking operation or process employing a novel catalyst.

In one of its aspects, the invention relates to a catalyst especially suited to the hydrocracking of the heavy hydrocarbons, the catalyst being composed of rhodium oxide and cobalt molybdate and alumina. In another of its aspects, the invention relates to the hydrocracking of a heavy oil, for example, an oil such as Wafra oil containing sulfur, employing a catalyst as herein described and claimed.

The cracking of heavy oils, especially oils containing sulfur, has been practiced in the presence of catalysts. It is known to employ for hydrocarbon conversion reactions a catalyst which is a supported cobalt-molybdenum oxide catalyst impregnated upon an adsorbent carrier such as activated alumina, alumina-silica, titania, or the like.

We have now found that a modified cobalt molybdate impregnated on alumina, that is, a cobalt molybdate on alumina catalyst also containing rhodium oxide, is superior to cobalt molybdate on alumina in at least the following respects. Coke formation is reduced, a lower temperature can be employed, there is a greater reduction in sulfur content of the product and there is a greater reduction in the carbon residue content of the product when the catalyst of the invention is employed for hydrocracking of feed stocks such as that set forth herein by way of example.

According to this invention, the new catalyst provided has substantially the following composition:

| | Weight percent |
|---|---|
| Rhodium | 0.1–1 |
| Cobalt | 1–5 |
| Molybdenum | 3–10 |
| Alumina | Balance |

Also according to this invention, there is provided a process for the hydrocracking of a hydrocarbon oil employing a catalyst as above defined. More particularly, according to the invention, the operating conditions can range as follows: temperature 700–850° F., pressure 500–3000 p.s.i.g., liquid hourly space velocity 0.1–1, 500–5000 cubic feet of hydrogen per barrel of oil being used when a heavy crude oil is the charge stock.

Generally speaking, with the catalyst composition of the invention at a given conversion level, the coke yield is about half that obtained when using the usual cobalt molybdate impregnated on alumina catalyst. Thus, at same conditions and conversion level, coke formation is considerably reduced. This effect is most noticeable at low oil through-put rates. In general, for a given temperature, the conversion is about 10 percent higher when using a rhodium oxide-cobalt molybdate catalyst of the invention in place of cobalt molybdate catalyst of the prior art.

The catalyst of the invention can be prepared by conventional methods of preparation. Thus, in the course of the preparation according to conventional practice of a cobalt molybdate catalyst supported on, say, activated alumina there can be added rhodium nitrate together with the cobalt nitrate to impregnate the carrier or the rhodium nitrate can be added before or after the cobalt nitrate is added.

The alumina or other carrier is prepared as is conventional in the art and can be shaped into the desired physical form prior to impregnation. Usually, there will be employed, as desired, an alumina or other carrier which is ground to a desired mesh size and admixed with a binder material and pilled. In the activation of the finished carrier and/or the catalyst, the binder material is ordinarily decomposed or burned out. The steps of preparing the carrier or support which is activated by the rhodium oxide and cobalt molybdate are well known in the art and need not be here further elaborated. Suffice to say that the final form of the catalyst will depend upon the final form of the carrier and this form will depend upon the use to which the catalyst is to be put. If the catalyst is to be used in a stationary bed, usually pills or pellets will be prepared. If the catalyst is to be employed in a fluidized process, the carrier or support which is activated will be ground into a much finer state before it is impregnated.

The following is an example of a preparation of a catalyst according to this invention.

*Example I*

A commercial alumina was impregnated with a solution containing 54.4 g. $(NH_4)_6Mo_7O_{24} \cdot 4H_2O$ in 200 cc. solution of ethanolamine and water (50/50 vol. percent). The alumina was soaked for 2 hours, drained, dried at 210–230° F., heated at 340–350° F. to remove most of the ethanolamine, and finally calcined in air at 1000° F. for about 6 hours. The resulting catalyst was soaked two hours in 150 cc. of solution which contained 33.5 g. $Co(NO_3)_2 \cdot 6H_2O$ and 10.0 g. $Rh(NO_3)_3 \cdot 2H_2O$. The catalyst was drained, dried at 210–230° F. and calcined in air at 1000° F. for about 6 hours. By analysis, the catalyst contained 5.24 weight percent Mo, 1.8 weight percent Co, and 0.33 weight percent Rh, and the surface area was 188 m.²/g.

*Example II*

The following is an example of the use of a catalyst according to this invention to hydrocrack a Wafra 400° F. plus crude.

The above-described Wafra crude was hydrocracked over a cobalt molybdate catalyst and over a cobalt molybdate catalyst modified with rhodium oxide. The catalysts were prepared, respectively, as follows:

The cobalt molybdate catalyst was prepared by a two-step impregnation of the metals on commercial alumina. The alumina was soaked for 2 hours in a 200 cc. ethanolamine-water (50/50 vol. percent) solution containing 27.2 g. $(NH_4)_6Mo_7O_{24} \cdot 4H_2O$. The catalyst was drained, dried at 210–230° F., heated at 340–350° F., and calcined overnight at 1000° F. in air. The resulting catalyst was soaked for 2 hours in a 200 cc. solution containing 44.7 g. $(Co(NO_3)_2 \cdot 6H_2O$. The catalyst was drained, dried at 210–230° F., and calcined at 1000° F. in air for about 6 hours. The catalyst contained 2.1 weight percent Co and 3.4 weight percent Mo and had a surface area of 186 m.²/g.

The cobalt molybdate catalyst modified with rhodium was prepared as described in Example I.

The cracking operation was effected in each case at temperatures of 750–850° F., a pressure of 1000 p.s.i.g., with 2000 cubic feet of hydrogen per barrel of oil which was fed at a liquid hourly space velocity of 0.5.

The following table shows comparatively the coke yield in terms of weight percent of catalyst based on six hour tests. The data are taken from plots of coke versus conversion for both catalysts.

| Percent Conversion of 850 ft. material | CoMoO₄ | CoMoO₄—Rh₂O₃ |
|---|---|---|
| 60 | 2.3 | 1.2 |
| 70 | 2.6 | 1.3 |
| 80 | 3.0 | 1.4 |
| 90 | 4.0 | 1.7 |
| 95 | 4.8 | 2.4 |
| 100 | 7.0–8.0 | 4.0 |

*Example III*

A Wafra 400° F. plus crude was hydrocracked at 0.25 liquid hourly space velocity, 1000 p.s.i.g., using 4000 cubic feet of hydrogen per barrel of oil. The data are based on six hour runs.

|  | NoMoO₄ | Rh₂O₃—CoMoO₄ |
|---|---|---|
| Temperature, °F | 800 | 775 |
| Conv., percent | 88 | 100 |
| Coke, wt. percent of Chg | 3.0 | 2.2 |
| Sulfur in Prod., wt. percent | 0.11 | 0.06 |
| Carbon Res. in Prod., wt. percent | 0.9 | 0.04 |

*Example IV*

The following tabular data are taken from runs at 775° F., 0.5 liquid hourly space velocity, 1000 p.s.i.g. using 4000 cubic feet of hydrogen per barrel of Wafra 400° F. plus crude oil. The runs were six hours of duration. The feed stock used had an 8.1 percent carbon residue, contained 3.6 weight percent sulfur and 55.0 weight percent 850° plus fraction. The 850° plus fraction contained 5.0 weight percent sulfur and had a 14.6 percent carbon residue.

|  | CoMoO₄ | Rh₂O₃—CoMoO₄ |
|---|---|---|
| Percent Conv. of 850° F. + | 65 | 73 |
| Coke, wt. percent of Chg | 1.2 | 1.3 |
| 850° F. + Fraction, wt. percent S | 0.14 | 0.10 |
| 850° F. + Fraction, wt. percent carbon Res. | 4.1 | 1.4 |

Although the coke formed is very slightly higher for the catalyst of this invention, this is the result of the considerably higher conversion. The catalyst of this invention produces less coke than one without rhodium oxide at the same as shown by Example II, which results were obtained with a lower hydrogen flow rate.

While the catalyst and operation according to the invention have been described and defined using a Wafra crude oil, it is clear that other similar crude oils can be used as charging stock as well as heavy distillates such as gas oils and the like.

Reasonable variation and modification are possible within the scope of the foregoing disclosure and the appended claims to the invention, the essence of which is that the conventional cobalt molybdate catalyst which is useful for hydrocracking of oils and for other conversion reactions, such as desulfurization, denitrogenation, hydrogenation, hydroforming, reforming, cracking, and the like, has been modified by incorporation of rhodium oxide, substantially as set forth and described herein.

We claim:

1. A modified cobalt molybdate catalyst comprising upon a suitable support 0.1–1 weight percent rhodium, 1–5 weight percent cobalt, 3–10 weight percent molybdenum and the remainder the support.

2. As a new catalyst composition suitable for hydrocracking of oils a supported cobalt-molybdenum oxide catalyst modified by incorporation of rhodium oxide therein, the catalyst having the following composition: rhodium 0.1–1 weight percent, cobalt 1–5 weight percent, molybdenum 3–10 weight percent and the balance a carrier selected from the group consisting of activated alumina, alumina-silica, and titania.

3. A catalyst according to claim 2 wherein the catalyst is supported on alumina.

4. A method for the hydrocracking conversion of a hydrocarbon oil which comprises contacting said oil under hydrocracking conversion conditions including an elevated temperature and pressure with a catalyst composition containing 0.1–1 weight percent rhodium, 1–5 weight percent cobalt, 3–10 weight percent molybdenum, the said constituents being deposited upon a suitable carrier.

5. A process for the hydrocracking of Wafra 400° F. plus crude which comprises hydrocracking said crude at a temperature in the range 750–850° F., a pressure in the range 500–3000 p.s.i.g. and a liquid hourly space velocity of 0.1–1, using 500–5000 cubic feet of hydrogen per barrel of oil with a catalyst containing 0.1–1 weight percent rhodium, 1–5 weight percent cobalt, 3–10 weight percent molybdenum and the balance an alumina catalyst support.

References Cited in the file of this patent

UNITED STATES PATENTS

| 2,675,390 | Rosenblatt | Apr. 13, 1954 |
| 2,861,959 | Thorn et al. | Nov. 25, 1958 |

FOREIGN PATENTS

| 275,670 | Great Britain | Nov. 9, 1928 |